Jan. 25, 1949.  J. PELMARSH  2,459,959
SINKER
Filed March 10, 1944
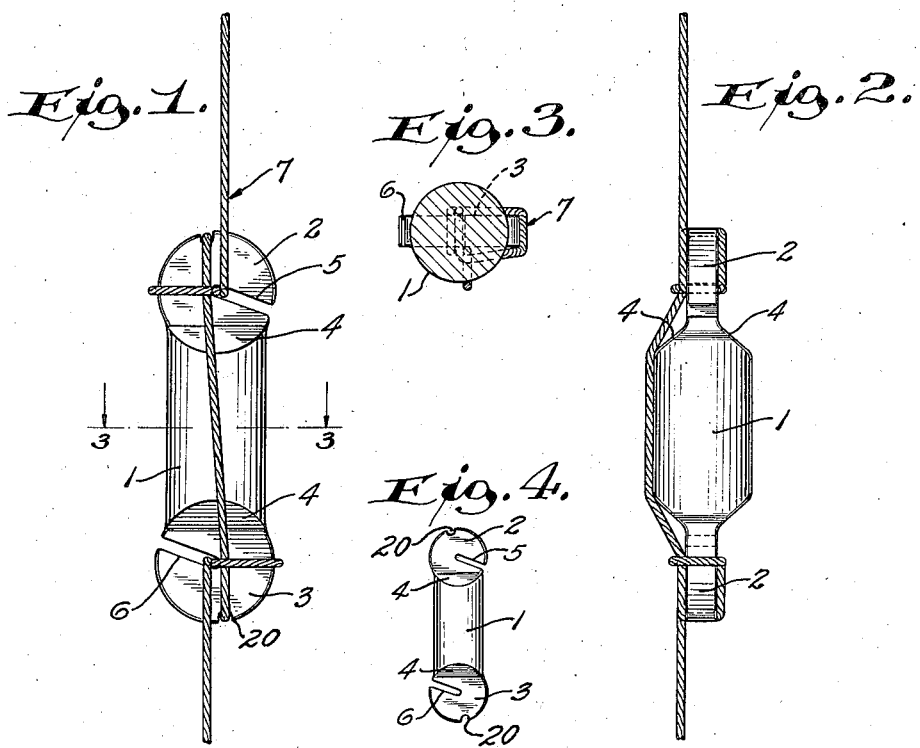
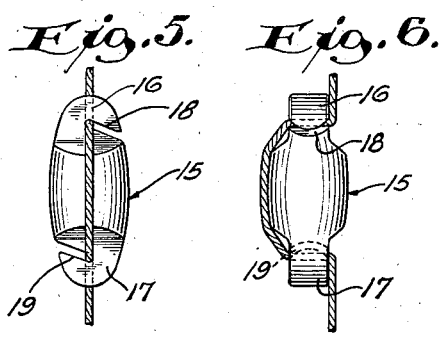
INVENTOR.
JOSEPH PELMARSH
BY
William F. Buckley
ATTORNEY.

Patented Jan. 25, 1949

2,459,959

UNITED STATES PATENT OFFICE 2,459,959

SINKER

Joseph Pelmarsh, Milwaukee, Wis.

Application March 10, 1944, Serial No. 525,896

2 Claims. (Cl. 43—52)

This invention relates to an improvement in sinkers or weights designed to be readily and securely attached to and also readily removable from a fishing line, fish net, or other flexible suspension line which, in operation, must be biased to descend downward, particularly through a liquid medium.

An object of the invention is to provide a device of this character which is extremely simple and compact in construction and which, nevertheless, may be readily and easily, though securely attached to any portion of the line without the necessity of parting the line or disturbing any of the other elements connected to the line. The device is just as readily removed. When attached to the line, the sinker or weight is symmetrically disposed so as not to kink or distort the line or deflect it from the direction in which it is pulled or the direction in which it is lowered through the water or other medium.

Another object is to provide a device of this character and having these capacities and advantages and which also presents a minimum resistance to its travel through the liquid or other medium in which it is environed.

Another object is to provide a sinker which can be manually locked upon the fish line and readily unlocked therefrom without requiring the use of special instruments and injury to the line.

These objects of the invention and other ancillary advantages are attained by the mechanism, construction, and arrangement illustrated in the accompanying drawings forming part hereof, in which:

Fig. 1 is a view in front elevation showing one embodiment of the invention and illustrating the sinker attached or combined with a fishing line;

Fig. 2 is a view in side elevation of the sinker and line shown in Fig. 1;

Fig. 3 is a view in horizontal cross section taken on line 3—3 of Fig. 1 and looking in the direction of the arrows;

Fig. 4 is a view in elevation on a reduced scale illustrating the sinker shown in Fig. 1 but detached from the line;

Fig. 5 is a view in side elevation showing still another form embodying certain features of the invention;

Fig. 6 is a view in side elevation of the sinker shown in Fig. 5; and

Fig. 7 is a view in top plan of the sinker illustrated in Fig. 6.

Referring to the drawings and more particularly to Figs. 1 to 4 it will be seen that a sinker embodying the present invention is constituted of a single piece of metal, preferably metal such as lead or some lead alloy. The construction comprises a cylindrical or bilged body 1 having flattened ends 2 and 3 of circular form, the junctures of the body 1 and the ends 2 and 3 being tapered or beveled as at 4. The flattened ends 2 and 3 are provided with inclined slots 5 and 6 which extend from a point near the center of the flattened ends out through the periphery thereof. The slot 5 at the upper end 2 of the sinker inclines outwardly and downwardly. The slot 6 in the lower flattened end 3 of the sinker inclines outwardly and upwardly; and the slots are disposed on opposite sides of the sinker and extend in opposite directions.

With such a construction a fishing line designated generally at 7 may be readily attached to or detached from the sinker and when attached it is securely held in position, and this in such a way that the sinker is symmetrically suspended on the line.

One convenient way of reeving a fishing line through the slots 5 and 6 is illustrated in Figs. 1 to 3.

Attachment and detachment is practical and convenient without removing the hook or parting the line. The flattened ends, with their circular shape, enable the sinker to deflect itself from weeds or other obstructions without fouling.

The form of the invention shown in Figs. 5 to 7 inclusive is of the general type shown in Figs. 1 to 4. However, in the form shown in Figs. 5 to 7, the body 15 of the sinker is of bilged or barrel shape and the ends 16 and 17, while flattened, are oval or semi-elliptical in their contour to present a streamlined surface of low resistance in the water. As before the upper flattened end 16 has a downwardly and outwardly inclined slot 18 on one side of the sinker whereas the lower flattened portion 17 has an upwardly and outwardly inclined slot 19 on the opposite side of the sinker.

Of course, the particular way of reeving the line through the slots of the sinker that has been described is not essential. Various other reeving methods or wraps may be resorted to.

Where it is desired to reeve the line over the ends of the sinker, notches 20 may be provided for the bights of the loops of the line to prevent side slipping, and enhance the security of the engagement of the sinker and line.

The sinker may be easily secured on a line without requiring the pinching of the line by closing of the slots and distortion of the metal.

The slanting slots enable the fastening and tensioning of the line without danger of its coming loose. A single loop around the flat end as by passing the line through notch 20 and through the slot a second time serves as a knot fastening the line securely against displacement.

The line passes in a longitudinal direction over the body of the sinker by reason of the root portions of the respective grooves being in alignment longitudinally and substantially parallel transversely of the longitudinal axis of the sinker, thereby avoiding spiral formations which tend to turn the line when the sinker is drawn through the water, and serving like a rudder to prevent turning of the sinker.

The relatively thin flat ends shown in the principal embodiment of Figs. 1 to 4 provide a somewhat knifelike cleavage of the water when the line is pulled and reduces the resistance to movement of the sinker through the water. The flat ends also serve like fins tending to prevent turning of the sinker in the water and twisting of the line. The line passes longitudinally from the sinker slightly to one side of the longitudinal center line of the sinker so that the pull on the sinker is substantially symmetrical with respect to the center.

Where the sinker is to be employed on lines for certain deep casting operations it is desirable to fasten the line by crimping the mouth of the slot closed. For this purpose the sinker should be made of soft lead so that the flat end can be distorted by hand to close the slot. Removal of the sinker from the line can be readily accomplished by the fingers and without the use of a knife or the like to open the slot, by merely turning the flat end around the longitudinal axis of the sinker until the two parts of the mouth of the slot are separated laterally sufficient for the removal of the line from the slot.

Where it is desired to open the slot to its original dimensions instead of turning the end, a knife or other tool may be employed to force a separation of the parts at the mouth of the slot without danger of injury to the line.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

What I claim is:

1. A sinker formed of soft metal and having a central body portion of large transverse dimension tapering toward its ends to a smaller dimension and each of the ends having integral therewith flattened portions providing relatively thin structures each of which has a slot therein, the slots extending in opposite directions to each other, the portions providing the edges of each slot being capable of being readily moved relatively to each other by manual manipulation without the use of tools so as to open and close the slot, such characteristic of the flattened portions being due to the material of which said sinker is made.

2. A sinker formed of soft metal and having an enlarged cylindrical central portion with its extreme ends tapered so as to provide flattened tabs of relatively thin dimensions with respect to the transverse dimension of the central portion and with each of said tabs having a slot therein, the slots extending in opposite directions to each other, the portions providing the edges of each slot being capable of being readily moved relatively to each other by manual manipulation without the use of tools so as to open and close the slot, such characteristic of the flattened portions being due to the material of which said sinker is made, and the end edge of said flattened tabs having a notch therein for receiving a turn of the line at the end.

JOSEPH PELMARSH.

REFERENCES CITED

The following references are of record in the file of this patent:

UNITED STATES PATENTS

| Number | Name | Date |
| --- | --- | --- |
| 231,417 | Foote | Aug. 24, 1880 |
| 441,447 | Stahl | Nov. 25, 1890 |
| 1,480,655 | Bennett | Jan. 15, 1924 |
| 1,869,305 | Dockman | July 26, 1932 |
| 1,883,574 | Cleeland | Oct. 18, 1932 |
| 2,043,817 | Stuck | June 9, 1936 |
| 2,257,415 | Gerdin | Sept. 30, 1941 |
| 2,322,241 | Kurz | June 22, 1943 |

FOREIGN PATENTS

| Number | Country | Date |
| --- | --- | --- |
| 464 | Great Britain | Oct. 9, 1899 |